US009016634B1

(12) United States Patent
Ratner et al.

(10) Patent No.: US 9,016,634 B1
(45) Date of Patent: Apr. 28, 2015

(54) PAYLOAD CUT-DOWN MECHANISM

(71) Applicant: Google Inc., Mountain View, CA (US)

(72) Inventors: Daniel Ratner, San Francisco, CA (US); Keegan Gartner, San Jose, CA (US)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/873,791

(22) Filed: Apr. 30, 2013

(51) Int. Cl.
*B64D 1/12* (2006.01)
*B64B 1/40* (2006.01)
*B64B 1/48* (2006.01)

(52) U.S. Cl.
CPC ... *B64B 1/40* (2013.01); *B64B 1/48* (2013.01); *B64D 1/12* (2013.01)

(58) Field of Classification Search
CPC .............. B64D 1/02; B64D 1/08; B64D 1/12; B64D 17/38; B64D 17/386
See application file for complete search history.

(56) References Cited

U.S. PATENT DOCUMENTS

| | | | |
|---|---|---|---|
| 1,390,745 | A | 9/1921 | Armstrong |
| 2,454,616 | A * | 11/1948 | Schultz ..................... 244/138 R |
| 2,502,097 | A * | 3/1950 | Linder ....................... 294/82.25 |
| 2,534,866 | A * | 12/1950 | Hakomaki ..................... 74/3.56 |
| 2,680,577 | A * | 6/1954 | Frieder et al. .................. 242/149 |
| 2,790,479 | A | 4/1957 | Mastenbrook |
| 2,907,843 | A * | 10/1959 | Thorness ..................... 200/83 C |
| 2,924,147 | A * | 2/1960 | Bohl et al. ....................... 89/1.14 |
| 2,924,408 | A * | 2/1960 | Yost .............................. 244/137.4 |
| 2,926,565 | A * | 3/1960 | Thorness ........................ 89/1.14 |
| 2,931,597 | A | 4/1960 | Moore, Jr. |
| 3,001,746 | A * | 9/1961 | King .............................. 244/149 |
| 3,047,259 | A | 7/1962 | Tatnall et al. |
| 3,119,578 | A | 1/1964 | Borgeson et al. |
| 3,229,517 | A * | 1/1966 | Arthur ....................... 73/170.28 |
| 3,390,853 | A | 7/1968 | Wykes |
| 3,433,435 | A | 3/1969 | Alai |
| 3,452,949 | A | 7/1969 | Maloney et al. |

(Continued)

FOREIGN PATENT DOCUMENTS

| | | |
|---|---|---|
| WO | 2011/160172 | 12/2011 |
| WO | 2012/012275 | 1/2012 |
| WO | 2012/025769 | 3/2012 |

OTHER PUBLICATIONS

Horwath et al., "Broadband Backhaul Communication for Stratospheric Platforms: The Stratospheric Optical Payload Experiment (STROPEX)," Society of Photo-Optical Instrumentation Engineers (SPIE), 2006, vol. 6304 (12 pages).

Giggenbach et al., "Optical Free-Space Communications Downlinks from Stratospheric Platforms—Overview on STROPEX, the Optical Communications Experiment of CAPANINA," 14th IST Mobile & Wireless Communications Summit, Jun. 2005, No. 483, Dresden, Germany (4 pages).

(Continued)

*Primary Examiner* — Brian M O'Hara
*Assistant Examiner* — Michael Kreiner
(74) *Attorney, Agent, or Firm* — McDonnell Boehnen Hulbert & Berghoff LLP.

(57) ABSTRACT

A payload cut-down mechanism having a pathway member having a first end and a second end attached to a balloon envelope, a line extending within the pathway member having first and second ends extending from the pathway member, where the first end of the line is releasably secured to a first actuated release mechanism attached to a payload, and a second end of the line releasably secured to a second actuated release mechanism attached to the payload, and wherein at least one of the first and second actuated release mechanisms are operable, upon receiving a signal, to release the first or second end of the line from one of the actuated release mechanisms and cause the payload to separate from the payload.

30 Claims, 10 Drawing Sheets

(56) References Cited

U.S. PATENT DOCUMENTS

| | | | |
|---|---|---|---|
| 3,614,031 | A | 10/1971 | Demboski |
| 3,807,384 | A | 4/1974 | Schach et al. |
| 3,840,988 | A * | 10/1974 | Hoffman ..................... 30/180 |
| 4,113,206 | A | 9/1978 | Wheeler |
| 4,127,246 | A * | 11/1978 | Andres ..................... 244/138 R |
| 4,174,082 | A | 11/1979 | Eshoo |
| 4,215,834 | A | 8/1980 | Dunlap |
| 4,262,864 | A | 4/1981 | Eshoo |
| 4,366,936 | A | 1/1983 | Ferguson |
| 4,592,524 | A * | 6/1986 | Nohren et al. ............ 244/151 B |
| 4,651,956 | A | 3/1987 | Winker et al. |
| 5,465,925 | A * | 11/1995 | Connolly et al. .......... 244/137.1 |
| 5,593,113 | A | 1/1997 | Cox |
| 5,645,248 | A | 7/1997 | Campbell |
| 6,119,979 | A | 9/2000 | Lee et al. |
| 6,324,398 | B1 | 11/2001 | Lanzerotti et al. |
| 6,540,178 | B1 | 4/2003 | Hillsdon |
| 6,607,166 | B1 | 8/2003 | Pichkhadze et al. |
| 6,628,941 | B2 | 9/2003 | Knoblach et al. |
| 6,648,272 | B1 | 11/2003 | Kothmann |
| 6,808,144 | B1 | 10/2004 | Nicolai et al. |
| 6,830,222 | B1 | 12/2004 | Nock et al. |
| 7,046,934 | B2 | 5/2006 | Badesha et al. |
| 7,178,761 | B2 * | 2/2007 | Wada et al. ............... 244/138 R |
| 7,341,223 | B2 | 3/2008 | Chu |
| 7,341,224 | B1 | 3/2008 | Osann, Jr. |
| 7,356,390 | B2 | 4/2008 | Knoblach et al. |
| 7,567,779 | B2 | 7/2009 | Seligsohn et al. |
| 7,568,656 | B2 | 8/2009 | Handley |
| 7,913,948 | B2 | 3/2011 | Porter |
| 7,948,426 | B2 | 5/2011 | Pevler et al. |
| 8,061,648 | B2 | 11/2011 | Lachenmeier |
| 8,167,236 | B2 | 5/2012 | Jess |
| 8,356,569 | B2 | 1/2013 | Sjoblom |
| 2004/0065773 | A1 | 4/2004 | Morales |
| 2006/0000945 | A1 | 1/2006 | Voss |
| 2008/0272233 | A1 | 11/2008 | Marlin |
| 2009/0294576 | A1 | 12/2009 | Laforge |
| 2010/0039984 | A1 | 2/2010 | Brownrigg |
| 2012/0031119 | A1 | 2/2012 | Ahmad et al. |
| 2012/0081908 | A1 | 4/2012 | Harms et al. |

OTHER PUBLICATIONS

Acampora et al., "A Broadband Wireless Access Network Based on Mesh-Connected Free-Space Optical Links," IEEE Personal Communications, Oct. 1999, 1070-9916/99, pp. 62-65.

Thornton et al., "Broadband communications from a high-altitude platform: the European HeliNet programme," Electronics & Communication Engineering Journal, Jun. 2001, pp. 138-144.

Akella et al., "Building Blocks for Mobile Free-Space-Optical Networks," IEEE, 2005, 0-7803-9019-9/05 (5 pages).

Grace, D. et al., "CAPANINA—Communications from Aerial Platform Networks Delivering Broadband Information for All," 14th IST Mobile & Wireless Communications Summit, Jun. 2005, No. 252, Dresden, Germany (5 pages).

Mohorcic et al., "Evaluation of Wavelength Requirements for Stratospheric Optical Transport Networks," Journal of Communications, Sep. 2009, vol. 4, No. 8, pp. 588-596.

Fortuna et al., "HAP based optical transport network design," Proceedings of the 15th International Electrotechnical and Computer Science Conference (ERK) Sep. 2006 (4 pages).

Aragon-Zavala et al., High-Altitude Platforms for Wireless Communications, John Wiley & Sons, Ltd., 2008, pp. C1-80.

Aragon-Zavala et al., High-Altitude Platforms for Wireless Communications, John Wiley & Sons, Ltd., 2008, pp. 81-158.

Aragon-Zavala et al., High-Altitude Platforms for Wireless Communications, John Wiley & Sons, Ltd., 2008, pp. 159-241.

Biswas, A. et al., "Deep Space Optical Communications Link Availability and Data Volume," Free-Space Laser Communication Technologies XVI, San Jose, CA, Jan. 2004 (9 pages).

Giggenbach et al., "Optical Data Downlinks from Earth Observation Platforms," Proceedings of the SPIE, 2009, vol. 7199 (14 pages).

Grace et al., "Integrating Users into the Wider Broadband Network via High Altitude Platforms," IEEE Wireless Communications, 1536-1286/05, Oct. 2005, pp. 98-105.

Akella et al., "Multi-channel Communication in Free-Space Optical Networks for the Last-mile," available online at: http://networks.ecse.rpi.edu/~sri/papers/Array-lanman07.pdf (last visited Jan. 18, 2012).

Willner et al., "Physical Layer Routing in Free-Space Optical Networks, LEOS," available online at: http://photonicssociety.org/newsletters/oct05/physical_layer.html (last visited Jan. 18, 2012).

Mullins, Justin "NASA Develops 'Smart' Weather Balloons for Launch Sites," NewScientist, May 23, 2007.

Hutchinson, James, Mobile Mesh Network Finds Interest in NGOs, Australian Red Cross enthusiastic about options presented by mesh telephony, available online at: http://www.computerworld.com.au/article/374682/mobile_mesh_network_finds_interest_ngos/ (last visited Jan. 17, 2012).

Dung Dinh Luong, et al., Network Architecture and Protocols, CAPANINA, Oct. 16, 2006, pp. 1-83.

Dung Dinh Luong, et al., Network Architecture and Protocols, CAPANINA, Oct. 16, 2006, pp. 84-172.

In Keun Son, Design and Optimization of Free Space Optical Networks, Auburn University, Dec. 13, 2010, pp. 1-78, Auburn, Alabama.

In Keun Son, Design and Optimization of Free Space Optical Networks, Auburn University, Dec. 13, 2010, pp. 79-147, Auburn, Alabama.

Hui Zang, et al., A Review of Routing and Wavelength Assignment Approaches for Wavelength-Routed Optical WDM Networks, Optical Networks Magazine, Jan. 2000, pp. 47-60.

Bloom, et al., "The Last-Mile Solution: Hybrid FSO Radio," AirFiber, Inc., May 2002, pp. 1-20.

Di Wang, et al., "Throughput Capacity of Hybrid Radio-Frequency and Free-Space-Optical (RF/FSO) Multi-Hop Networks," Department of Electrical, Computer and Systems Engineering, Rensselaer Polytechnic Institute, pp. 1-8.

Smadi, et al., "Free-Space Optical Gateway Placement in Hybrid Wireless Mesh Networks," Journal of Lightwave Technology, Jul. 15, 2009, vol. 27, No. 14, pp. 2688-2697.

Eddleston, et al., Mesh Networking Soars to New Heights, available online at: http://www.airballooningevent.com/mesh-networking-soars-to-new-heights (last visited Jan. 18, 2012) (Feb. 19, 2005).

Walsh, Balloon Network Test Successful, available online at: http://17.taylor.edu/community/news/news_detail.shtml?inode=14221 (last visited Jan. 18, 2012) Nov. 5, 2007.

Tozer et al., High-altitude platforms for wireless communications, Electronics & Communication Engineering Journal, Jun. 2001, 127-137.

Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012), pp. 1-19.

Ozdaglar, et al., Routing and Wavelength Assignment in Optical Networks, available online at: http://web.mit.edu/asuman/www/documents/RWA_Paper.pdf (last visited Jan. 18, 2012), pp. 1-25.

Grace et al., Broadband Communications via High Altitude Platforms, John Wiley & Sons, Ltd., 2011, pp. 49-73.

Grace et al., Broadband Communications via High Altitude Platforms, John Wiley & Sons, Ltd., 2011, pp. 75-113.

Grace et al., Broadband Communications via High Altitude Platforms, John Wiley & Sons, Ltd., 2011, pp. 219-238.

Balaram et al., "Autonomous Mobility, Navigation and Control for Venus Aerobots," International Symposium on Artificial Intelligence, Optics and Automation in Space, Jul. 14, 1997, Tokyo, Japan, pp. 1-7.

Carten Jr., Andrew S., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts, pp. 1-62.

Corbett et al., High Altitude Balloon Project, Wright State University, Engineering Design, Mar. 11, 2006, Dayton, Ohio, pp. 1-76.

International Search Report for PCT/US2013/020525 mailed Apr. 22, 2013, 16 pages.

* cited by examiner

PAYLOAD CUT-DOWN MECHANISM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a payload cut-down system for separating a payload from a balloon envelope is provided having a pathway member having a first end and a second end, the pathway member attached to a balloon envelope, a line having a first end and a second end, the line extending within the pathway member from the first end of the pathway member to the second end of the pathway member, the first end of the line extending from the first end of the pathway member and the second end of the line extending from the second end of the pathway member, the first end of the line releasably secured to a first actuated release mechanism, the second end of the line releasably secured to a second actuated release mechanism, wherein the first actuated release mechanism is attached to a payload, wherein the second actuated release mechanism is attached to the payload, and wherein at least one of the first and second actuated release mechanisms are operable, upon receiving a signal, to release the first or second end of the line from one of the actuated release mechanisms and cause the payload to separate from the payload.

In another aspect, a balloon is provided having a balloon envelope, a payload positioned beneath the balloon envelope, a pathway member having a first end and a second end, the pathway member attached to the balloon envelope, a line having a first end and a second end, the line extending within the pathway member from the first end of the pathway member to the second end of the pathway member, the first end of the line extending from the first end of the pathway member and the second end of the line extending from the second end of the pathway member, the first end of the line releasably secured to a first actuated release mechanism, the second end of the line releasably secured to a second actuated release mechanism, wherein the first actuated release mechanism is attached to a payload, wherein the second actuated release mechanism is attached to the payload, and a control system configured such that, upon receiving a signal, at least one of the first and second actuated release mechanisms are operable to release the first or second end of the line from one of the actuated release mechanisms and cause the payload to separate from the balloon envelope.

In another aspect, a computer-implemented method is provided, comprising the steps of operating a control system for a balloon comprised of a balloon envelope, a payload positioned beneath the balloon envelope, and a payload cut-down mechanism comprising a pathway member having a first end and a second end, the pathway member attached to the balloon envelope, a line having a first end and a second end, the line extending within the pathway member from the first end of the pathway member to the second end of the pathway member with the first end of the line extending from the first end of the pathway member and the second end of the line extending from the second end of the pathway member, the first end of the line releasably secured to a first actuated release mechanism and the second end of the line releasably secured to a second actuated release mechanism, where the first and second actuated release mechanisms are attached to the payload, receiving a signal to separate the payload from the balloon envelope, causing at least one of the first and second actuated release mechanisms to release the first or second end of the line from one of the actuated release mechanisms, and thereby causing the payload to separate from the balloon envelope.

In another aspect, a non-transitory computer readable medium has stored therein instructions that are executable by a computing device to cause the computing device to perform functions comprising operating a control system for a balloon comprised of a balloon envelope, a payload positioned beneath the balloon envelope, and a payload cut-down mechanism comprising a pathway member having a first end and a second end, the pathway member attached to the balloon envelope, a line having a first end and a second end, the line extending within the pathway member from the first end of the pathway member to the second end of the pathway member with the first end of the line extending from the first end of the pathway member and the second end of the line extending from the second end of the pathway member, the first end of the line releasably secured to a first actuated release mechanism and the second end of the line releasably secured to a second actuated release mechanism, where the first and second actuated release mechanisms are attached to the payload, receiving a signal to separate the payload from the balloon envelope, causing at least one of the first and second actuated release mechanisms to release the first or second end of the line from one of the actuated release mechanisms, and thereby causing the payload to separate from the balloon envelope.

In a further aspect, a balloon is provided having a balloon envelope, and a payload releasably secured to the balloon envelope, and means for separating the payload from the balloon envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
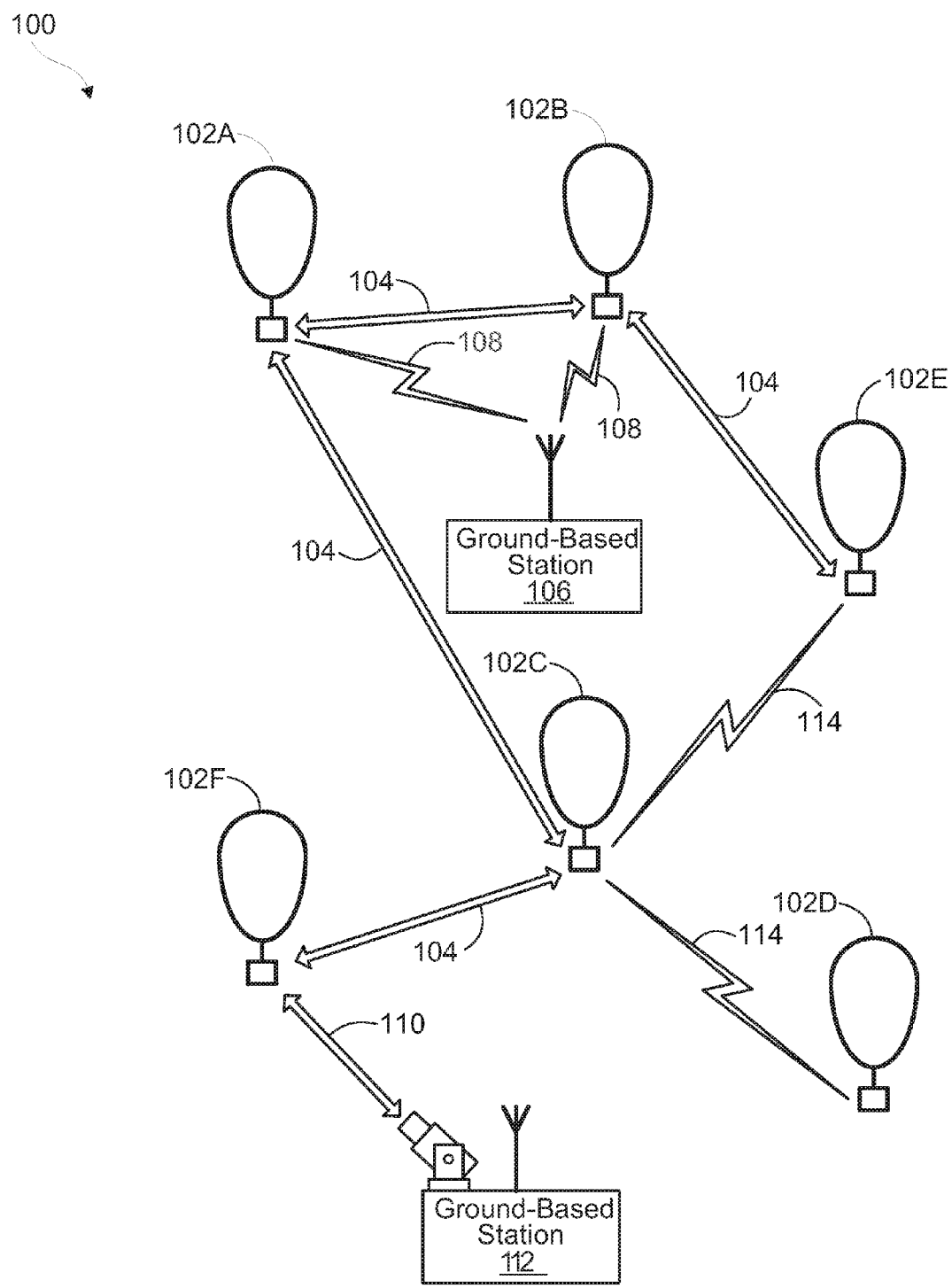
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, such balloons may include an envelope, a payload, and a cut-down system that is attached between the balloon and payload, along with various other components.

Instruments and electronic equipment may be positioned within a payload that may be used for communication, or to record various data and information. After a period of time, it may be desirable to have the payload return to the surface of the earth to retrieve and/or replace the instruments and electronic devices positioned in the payload. There may also be other, perhaps more important, reasons to bring the payload down to the earth's surface. For example, the balloon payload may be brought down to provide necessary upgrades to the electronic equipment within the payload. Or, the payload may be brought down to prevent the payload from entering into unauthorized air space. Other reasons are also possible.

The balloon envelope may be deflated or collapsed to allow the payload to descend to the surface of the earth. For example, the balloon envelope may be caused to rip, opening a hole in the envelope to deflate the balloon. However, the balloon envelope may take time to deflate, or fail to deflate properly, resulting in undesired unpredictability and unreliability in bringing the payload down to earth. If a line or cord is used to attach the balloon envelope to the payload, the cut-down mechanism may include mechanical, electromagnetic, or thermal devices to sever the line or cord to separate the balloon envelope from the payload.

However, the balloon envelope and payload operate at high altitudes where they experience a wide environmental temperature range, from extreme cold during the night to extreme heat when exposed to the sun during the day. As a result, the payload cut-down mechanism must reliably work even at the extreme hot and cold temperatures that they must operate in. Therefore, a cut-down mechanism that includes a redundancy, or a fail-safe feature, such that the cut-down mechanism will still serve to separate the payload from the balloon envelope in the event that the cut-down mechanism fails to work properly, may be advantageous.

Example embodiments may be directed to a payload cut-down mechanism that may be used to reliably and quickly separate a payload from a balloon envelope at a desired time. The payload cut-down mechanism may be attached to a balloon envelope and to a payload. The payload cut-down mechanism includes two actuated release mechanisms, where upon receiving an appropriate signal to separate the payload from the balloon envelope, an actuating member of each of the actuated release mechanisms is moved causing the payload to separate from the balloon envelope.

The actuated release mechanisms of the payload cut-down mechanism may be secured, directly or indirectly, to the payload. For example, the actuated release mechanisms could be secured to the payload, indirectly, via attachment to a payload harness or a drag disk or drag plate to which the payload is secured. The payload cut-down mechanism may also include a tube or pathway member that is secured, directly or indirectly, to the balloon envelope. For example, the tube or pathway member could be secured to the balloon envelope, indirectly, via attachment to a plate which is attached to the balloon envelope.

A flexible line or cord may be positioned in, and extend through, the tube or pathway member, where a first end of the line or cord is releasably secured to one of the actuated release mechanisms and the second end of the line or cord is releasably secured to the other actuated release mechanism. Thus, the balloon envelope is attached to the payload by actuated release mechanisms securing both ends of the line or cord. Upon receiving a signal to separate the payload from the balloon envelope, the actuating member of the actuated release mechanisms is moved to release the first and second ends of the line, resulting in the separation of the payload from the balloon envelope. The tube or pathway member of the payload cut-down mechanism remains with the balloon envelope, and the actuated release mechanisms remain with the payload. If desired, the positioning could be reversed with the actuated release mechanisms remaining with the balloon envelope and the tube or pathway member remaining with the payload.

In some embodiments, the actuated release mechanisms may advantageously comprise a solenoid. Solenoids have the advantage operating reliably at very low temperatures, and take very little power to operate, which is important on a high altitude balloon where there may be limited power available to operate the electrical equipment and components on board.

The actuated release mechanism could use a trigger release mechanism such as the type used for archery releases, where a pair of opposed pivotable jaws may be closed around a loop in the end of the line or cord to releasably secure the end of the line or cord to the actuated release mechanism. Upon receiving an appropriate signal, the trigger of the actuated release mechanism could be moved causing the jaws to open and release the end of the line or cord. An archery-type release mechanism may be useful because they have been optimized mechanically for maximum holding force and minimum actuation force, as they have excellent holding force but may be tripped by the touch of a finger.

The trigger release mechanism could be moved in a variety of different ways. For example, a solenoid having a linear actuating member that moves in a linear direction upon activation may be used. A rigid member could be attached to the trigger at one end and attached to the linear actuating member at the other end, such that upon receiving an appropriate signal, the solenoid is activated thereby moving the linear actuating member which in turns moves the trigger causing the jaws to open and release the end of the line or cord that was releasably secured within the jaws.

As noted above, the pathway member of the payload cut-down mechanism remains with the balloon envelope, and the actuated release mechanisms remain with the payload. Therefore, the actuated release mechanisms may be reused after retrieval of the payload. In addition, the actuated release mechanisms may be tested on the ground before flight to insure they are working properly. Thus the present actuated release mechanisms used in the payload cut-down mechanism provide an advantage over thermal cut-down methods that may burn the line or cord to effect separation because they cannot be tested prior to launch, and may only be used once.

A significant advantage provided by the use of the two actuated cut-down mechanisms, a tube or pathway member, and a line or cord extending through the tube or pathway member with the ends of the line or cord releasably secured to the actuated release mechanisms is that a redundancy, or fail safe feature, is provided for the payload cut-down mechanism. In particular, if one of the actuated release members fails to release an end of the line or cord, the actuation of the other actuated release mechanism will still serve to effect the separation of the payload from the balloon envelope.

In particular, if one end of the line or cord remains attached to the actuated release mechanism, the other end of the cord will simply slip through tube or pathway member causing the tube or pathway member which is secured to the balloon envelope to separate from the payload. The balloon envelope may remain aloft with the pathway member attached, as the payload descends. A parachute, or drag disk or drag plate may be used to slow the descent of the payload.

2. EXAMPLE BALLOON NETWORKS

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
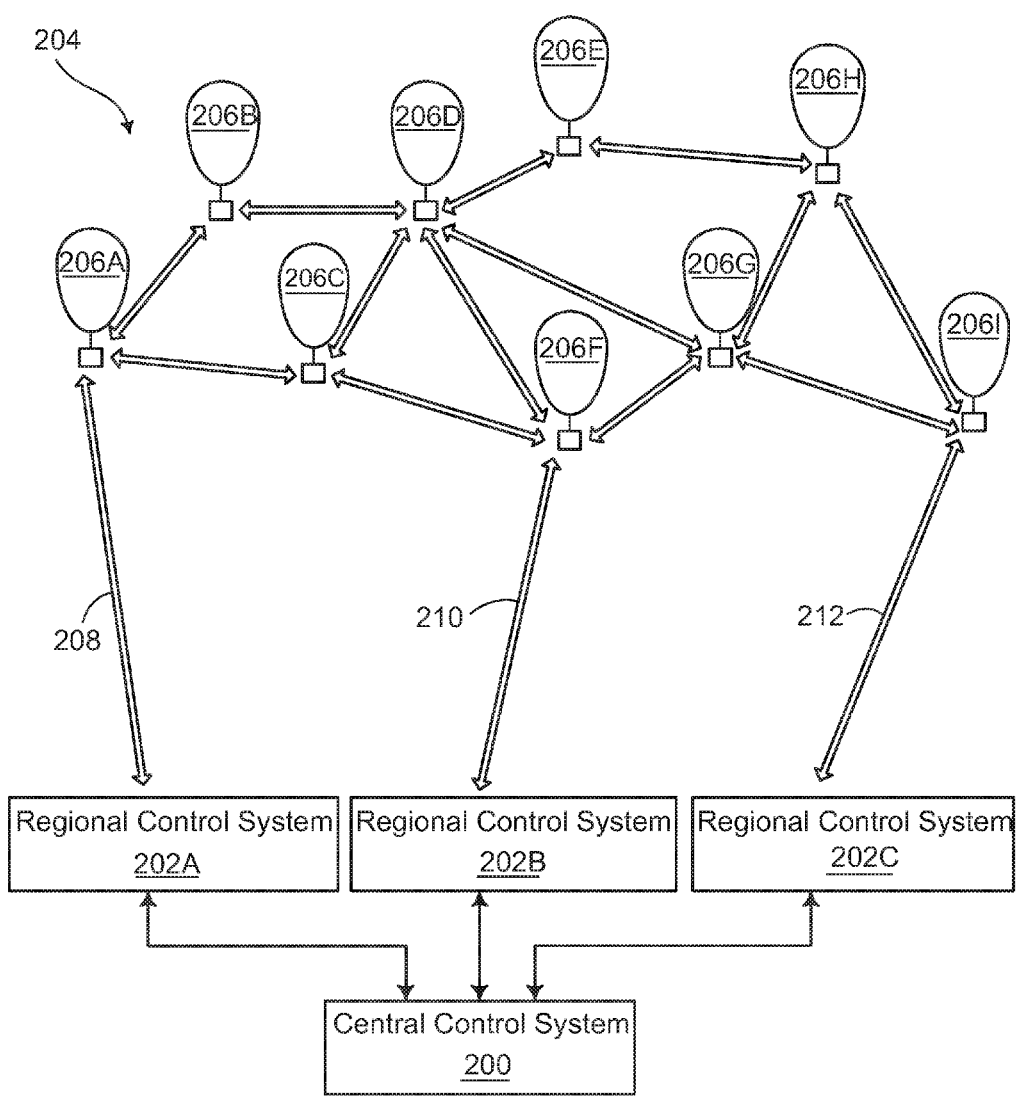
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use latitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
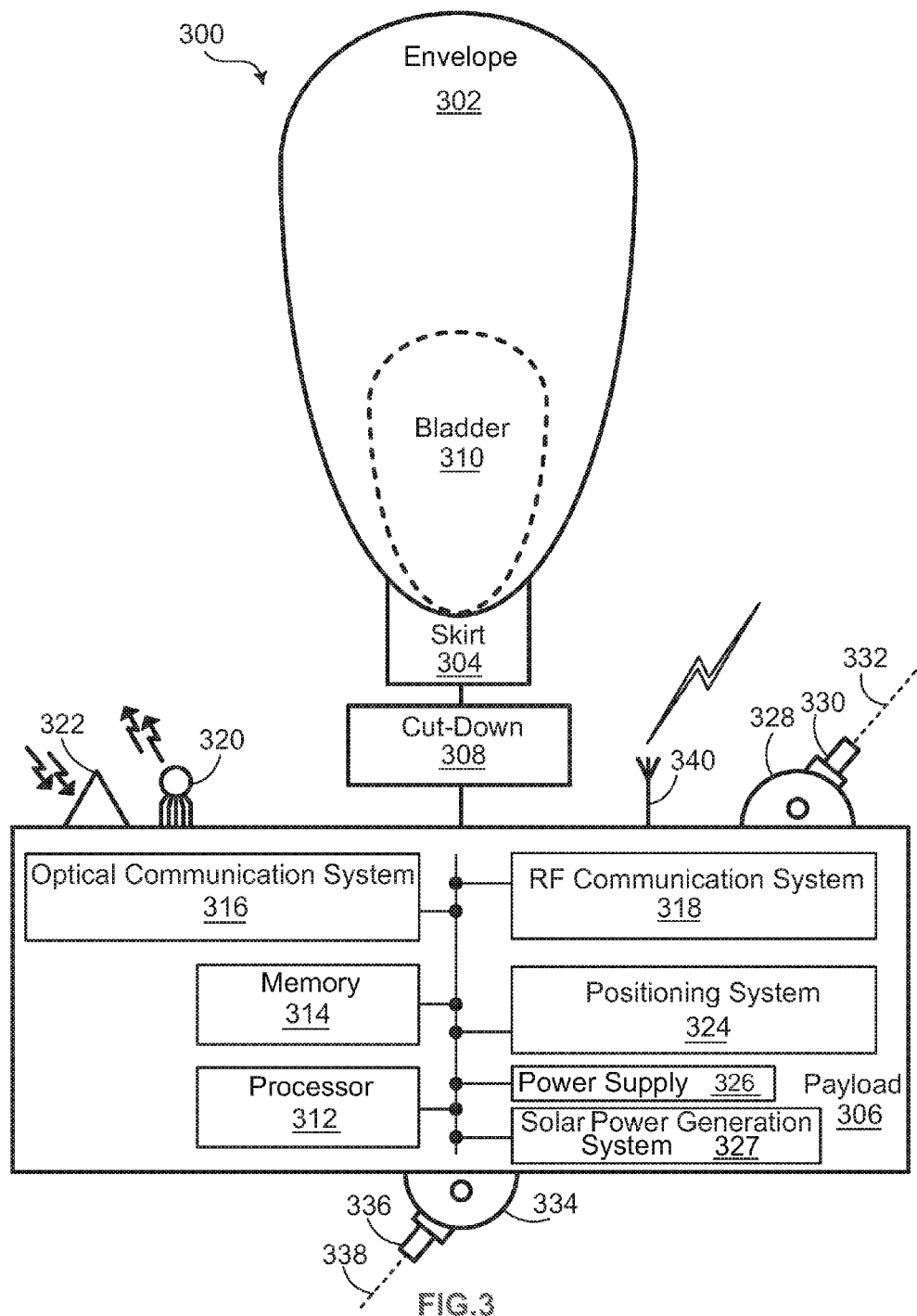
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force.

In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. BALLOON NETWORK WITH OPTICAL AND RF LINKS BETWEEN BALLOONS

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
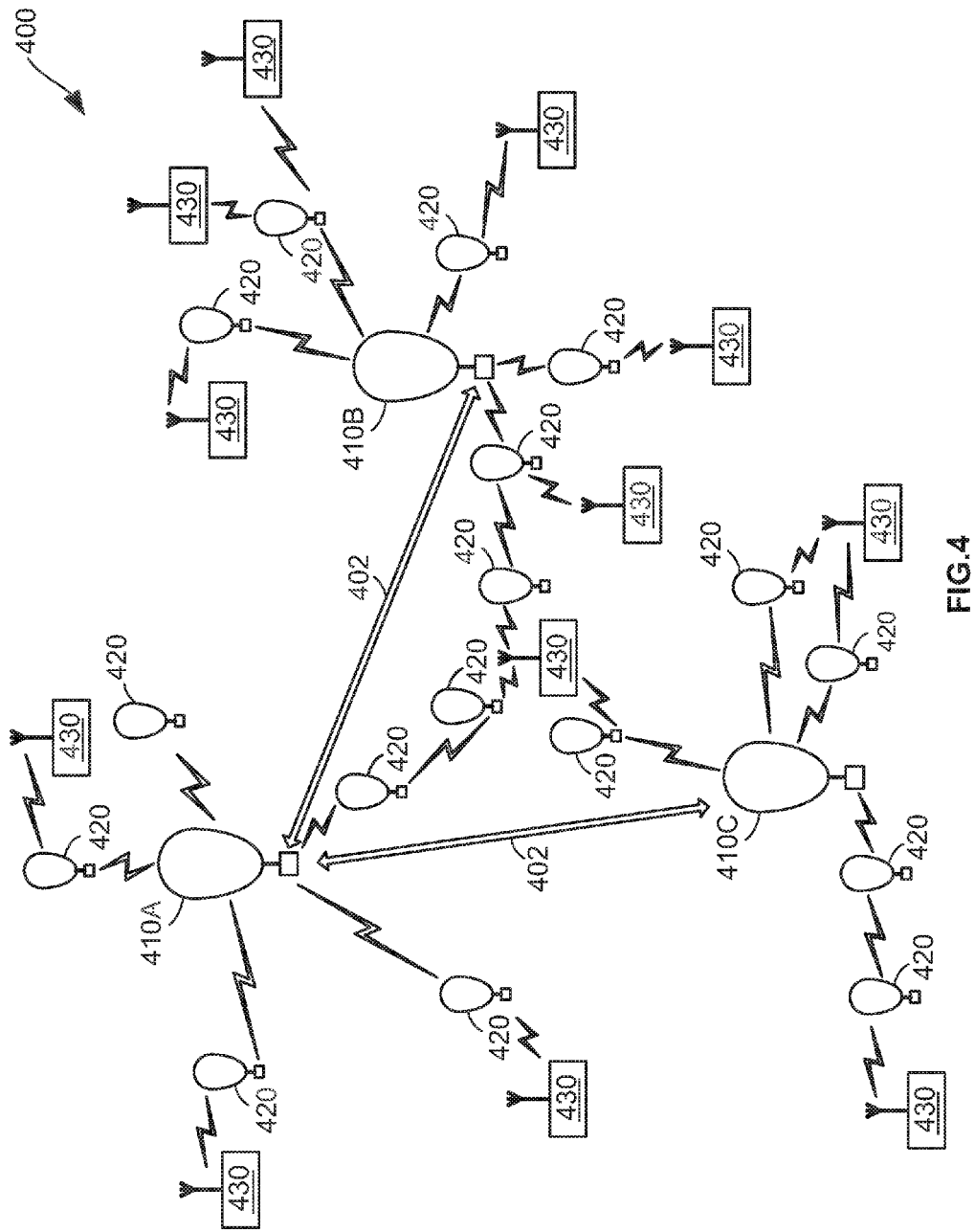
FIG. 4 shows a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. EXAMPLES OF PAYLOAD CUT-DOWN MECHANISMS

As noted above, instruments or electronic devices may be positioned within a payload attached to a high atmosphere balloon. After a period of time, it may be desirable to have the payload return to the surface of the earth for a number of reasons, such as to repair or replace equipment, to retrieve the information obtained from and stored in the instruments and electronic devices positioned in the payload, or to prevent the balloon from entering unauthorized air space. A payload cut-down mechanism may be used to separate the payload from the balloon envelope, to return the payload to the surface of the earth.

The balloon envelope and payload operate at high altitude where they experience a wide environmental temperature range, from extreme cold during the night to extreme heat when exposed to the sun during the day. Example embodiments of a payload cut-down mechanism may be directed to a mechanism that operates reliably even at the extreme hot and cold temperatures, and that include a redundancy, or fail-safe feature, such that the cut-down mechanism will still serve to separate the payload from the balloon envelope in the event that the cut-down mechanism fails to work properly.

Figure 5:
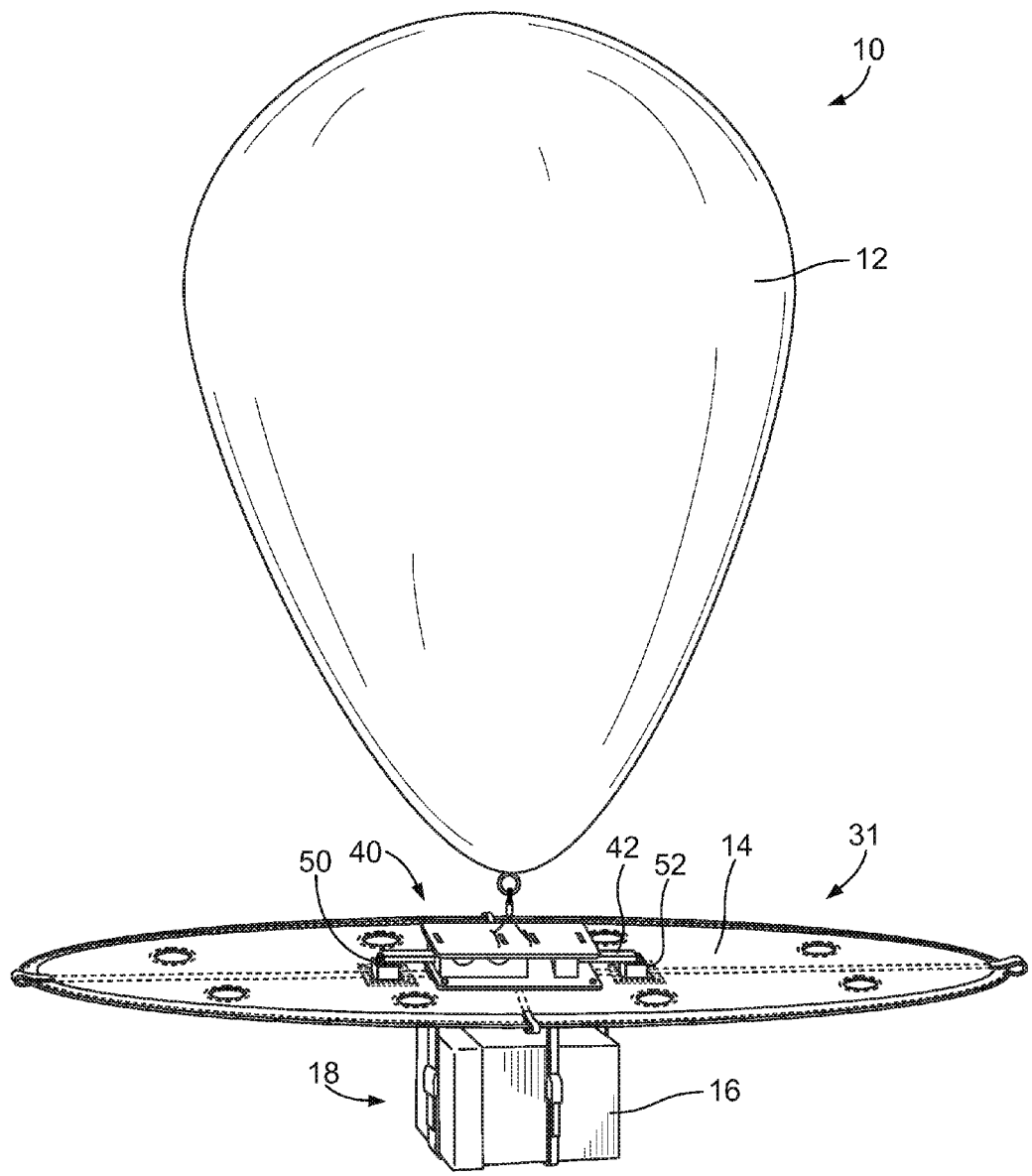
FIG. 5 shows a perspective view of balloon envelope 12 positioned above payload 16 and payload cut-down mechanism 40, according to an example embodiment.

As shown in FIG. 5, a balloon 10 having balloon envelope 12 is shown positioned above a payload drag structure 31 that includes a drag disk 14 that has a payload harness 18 that is used to secure payload 16 to drag disk 14. It will be appreciated that the depiction of a payload drag structure 31 is exemplary, and that while a drag disk 14 may be used to slow the descent of the payload 16 after separation from the balloon envelope 12, it is not required. Other means for slowing the descent of the payload could be used, such as a parachute or drag plate. In FIG. 5, a payload cut-down mechanism 40 is shown including a first actuated release mechanism housing 50 and a second actuated release mechanism housing 52, as well as tube 42 that may serve as a pathway member between the first and second actuated release mechanisms.

Figure 6A:
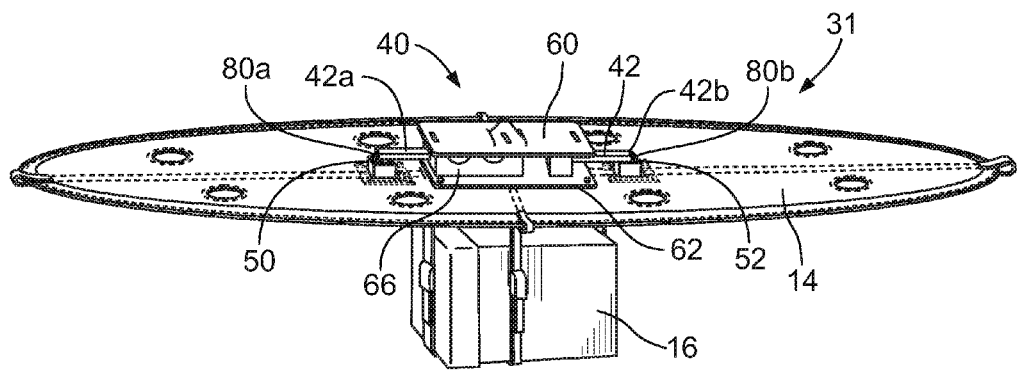
FIG. 6A shows a perspective view of payload 16 secured beneath a drag disk 14 and payload cut-down mechanism 40 before a balloon is attached to the payload cut-down mechanism, according to an example embodiment.

FIG. 6A is a perspective view of the payload drag structure 31 with payload cut-down mechanism 40 prior to the attachment of a balloon envelope. An upper plate 60 is shown attached to tube 42. A flexible line or cord 80 extends through tube or pathway member 42 having a first end 80a releasably secured to actuated release mechanism 98 and a second end 80b releasably secured to actuated release mechanism 88 (see FIGS. 6B and 7). Upper plate 60 is adapted for attachment to a balloon envelope. Upper plate 60 is shown positioned above tube 42, but it could also be positioned beneath tube 42, or even integral therewith. A first end 42a of tube 42 extends from one end of upper plate 60, and a second end 42b of tube 42 extends from another end of upper plate 60.

A lower plate 62 is shown positioned beneath upper plate 60 and is shown attached to payload 16, via the attachment of payload 16 to drag disk 14. Foam 66 is positioned between upper plate 60 and lower plate 62. In this embodiment, the lower plate 62 is attached to drag disk 14, but could also be attached directly to payload 16. As used herein the term "attached to" or "secured to" means an article that is connected to another article either directly, or indirectly. Thus, as shown in FIG. 6A, upper and lower plates 60 and 62 are shown as "attached to" to payload 16 because they are indirectly connected to payload 16.

Figure 6B:
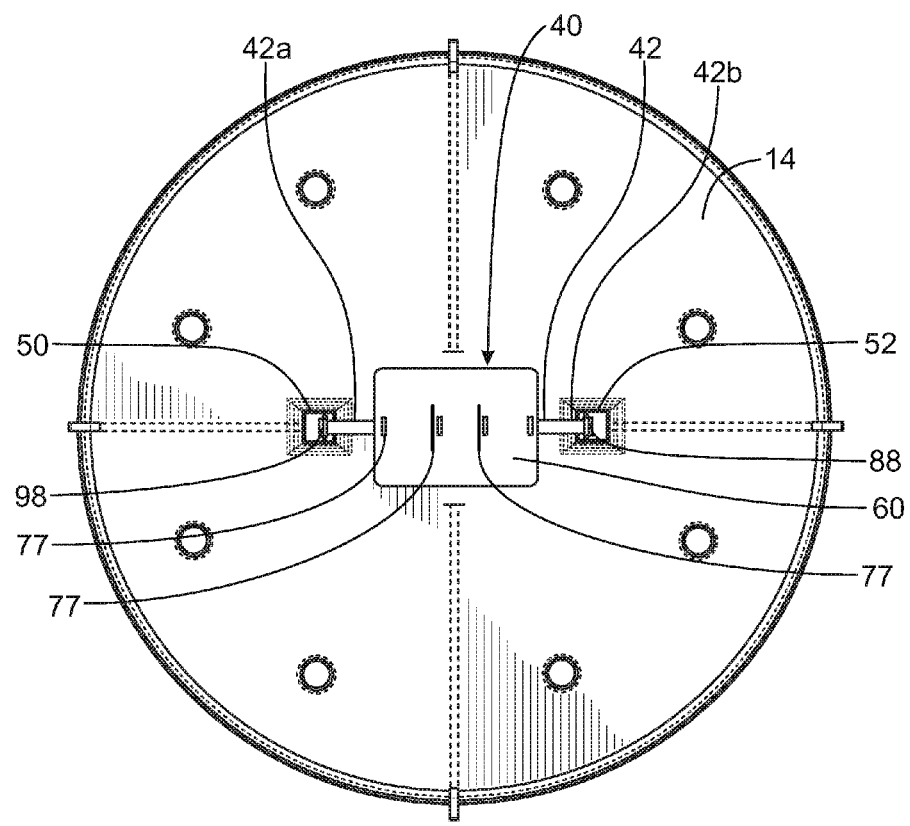
FIG. 6B shows a top view of payload cut-down mechanism 40 positioned above drag disk 14 shown in FIG. 6A, according to an example embodiment.

FIG. 6B is a top view of the payload drag structure 31 and payload cut-down mechanism 40 shown in FIG. 6A. Upper plate 60 is shown attached to tube or pathway member 42 with ties 77. First end 42a of tube or pathway member 42 extends above actuated release mechanism housing 50 and actuated release mechanism 98 positioned therein. Second end 42b of tube or pathway 42 extends above actuated release mechanism housing 52 and actuated release mechanism 88 positioned therein.

Figure 7:
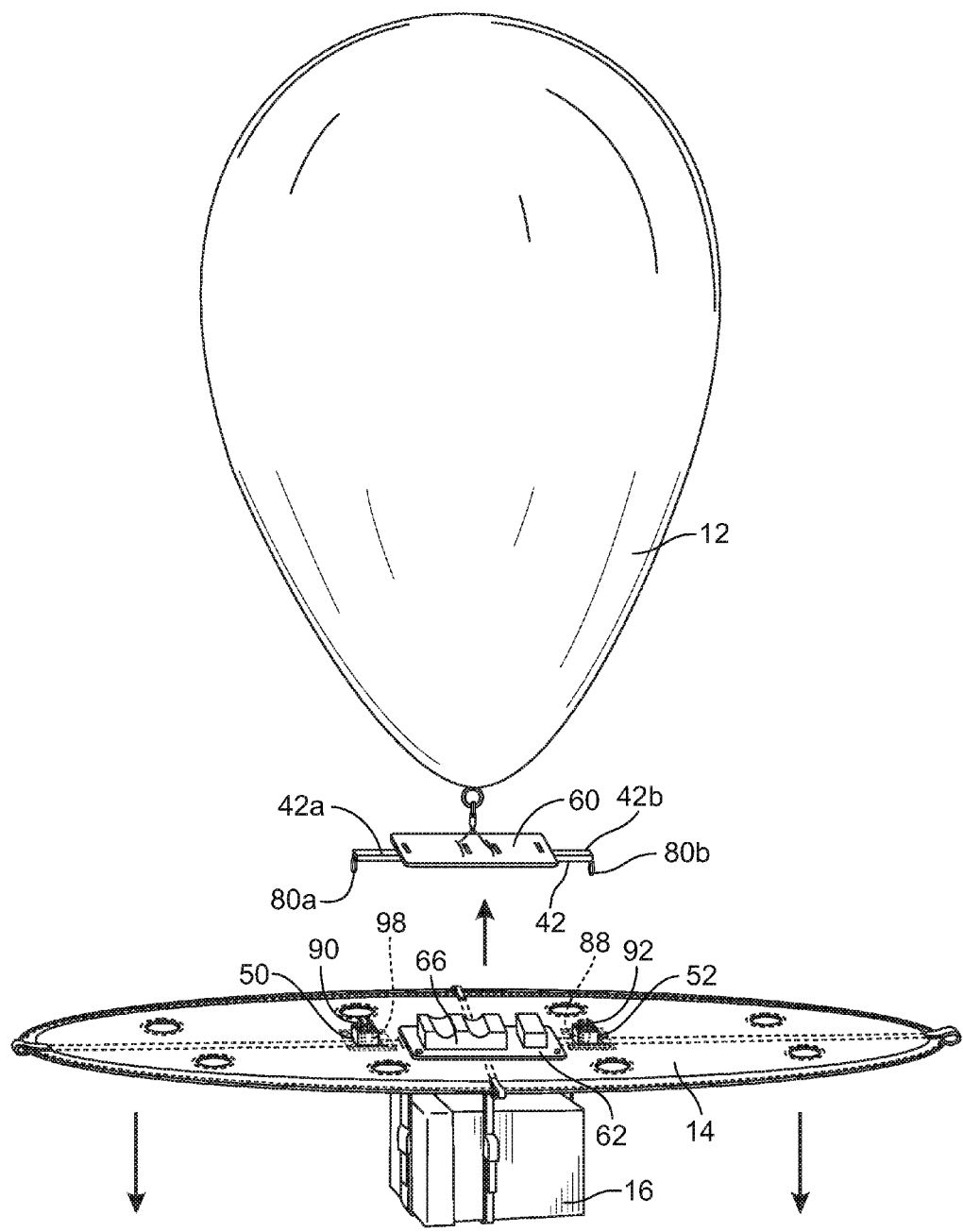
FIG. 7 shows a perspective view of the payload 16 and drag disk 14 shown separated from balloon envelope 12, with pathway member 42 and plate 60 remaining attached to balloon envelope 12, according to an example embodiment.

FIG. 7 is a perspective view showing balloon envelope 12 and payload drag structure 31 after the balloon envelope 12 has been separated from the payload 16. A flexible line or cord 80 is shown extending through the tube or pathway member 42, where first end 80a of the line or cord 80 has been released from actuated release mechanism 98 and the second end 80b of the line or cord 80 has been released from actuated release mechanism 88. In this embodiment, the balloon envelope 12 is initially secured to the payload 16 by actuated release mechanisms 98 and 88 securing both ends 80a and 80b of the line or cord 80.

Upon receiving a signal to separate the payload 16 from the balloon envelope 12, an actuating member of the actuated release mechanisms 98 and 88 is moved to release the first and second ends 80a and 80b of the line or cord 80, resulting in the separation of the payload 16 from the balloon envelope 12. In this embodiment, the tube or pathway member 42 of the payload cut-down mechanism 31 remains with the balloon envelope 12, and the actuated release mechanisms 98 and 88 remain with the payload 16, as do lower plate 62 and foam 66.

However, it will be appreciated that the positioning of the tube or pathway 42 and the actuated release mechanisms 98 and 88 are reversed, such that the tube or pathway 42 is attached to the payload and the actuated release mechanism 98 and 88 are attached to the balloon envelope 12. It is preferred to have the actuated release mechanisms 98 and 88 positioned on the payload so that they be retrieved and potentially reused.

Figure 8:
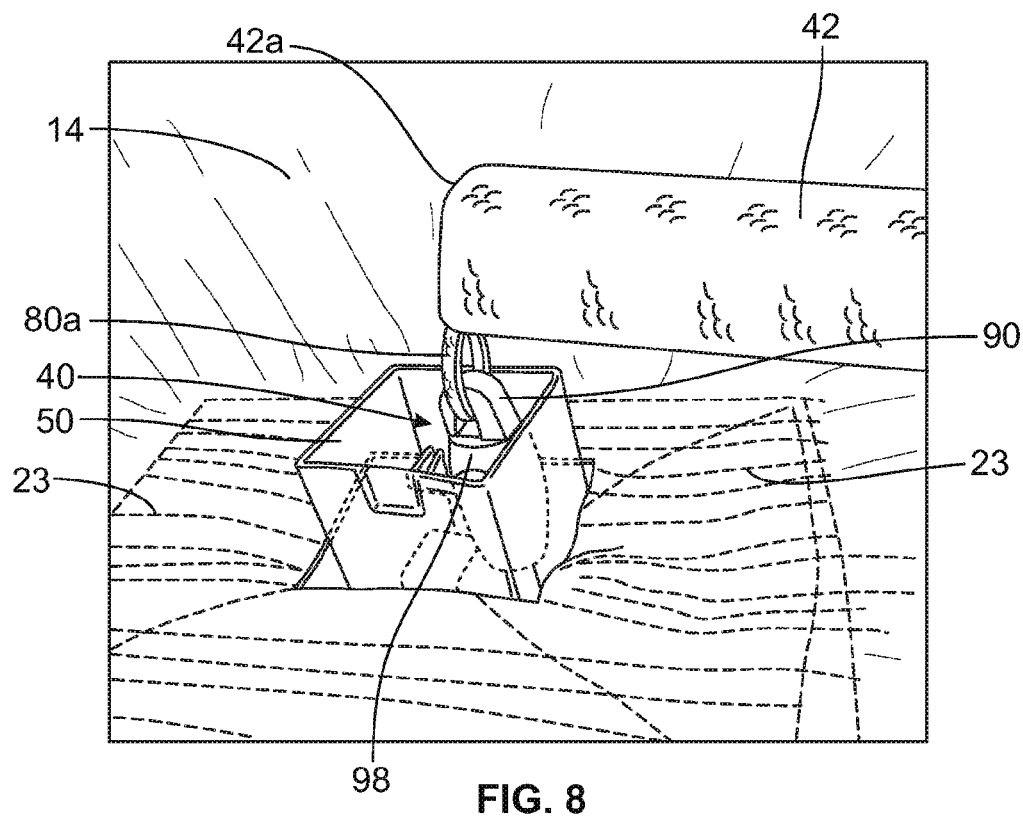
FIG. 8 is a close up perspective view of pathway member 42 with line 80a extending from end 42a and releasably secured to first actuating release mechanism 98 as shown in FIGS. 5 and 6A, according to an example embodiment.

FIG. 8 shows a close up perspective view of the left side of tube or pathway member 42 and actuated release mechanism 98. A first end 80a of line or cord 80 is shown extending from first end 42a of tube or pathway member 42. First end 80a has a loop formed therein that is releasably secured within jaws 90 of actuated release mechanism 98 shown positioned within actuated release mechanism housing 50 which extends through drag disk 14. Stitching 23 is sewn into drag disk 14 to strengthen the drag disk around actuated release mechanism housing 50. A similar arrangement is found on the right side of tube or pathway member 42 with actuated release mechanism 88, where the second end 80b of line or cord 80 has a loop formed therein that is releasably secured within jaws of the actuated release mechanism 88 positioned within actuated release mechanism housing 52.

Figure 9:
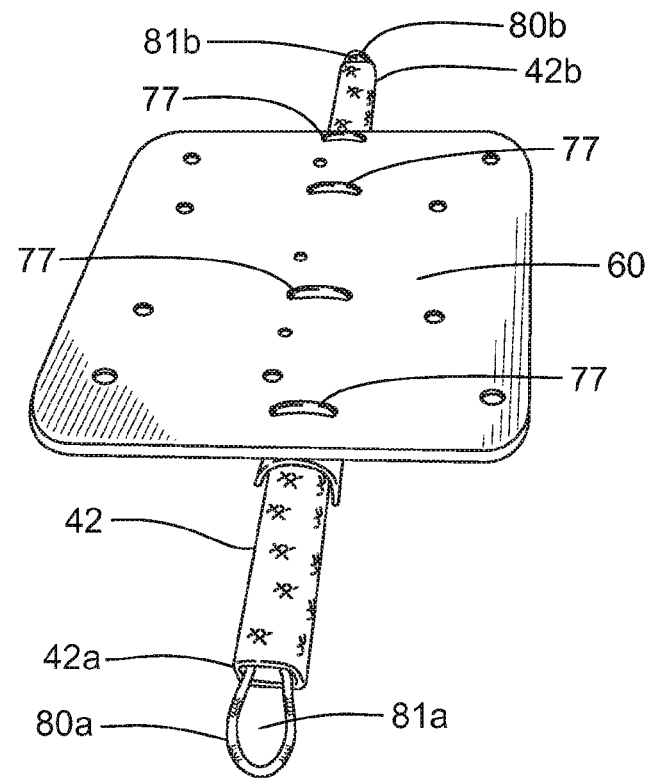
FIG. 9 shows a perspective view of plate 60, pathway member 42, and line 80 of payload cut-down mechanism 31 shown in FIGS. 5-7, according to an example embodiment.

FIG. 9 shows a perspective top view of the upper plate 60 and tube or pathway member 42 that is part of the payload cut-down mechanism. Ties 77 extend through holes in upper plate 60 and encircle tube or pathway 42 to secure the tube or pathway 42 to upper plate 60. Line or cord 80 is shown with first end 80a extending from first end 42a of tube 42 and second end 42b extending from second end 42b of tube 42. Each end of line or cord 80 may include a loop 81a or 81b formed therein that can be releasably secured within jaws of actuated release mechanism 98 or 88 (not shown). Tube 42 is preferably a carbon fiber tube which is lightweight, has acceptable strength properties, and has a smooth surface so that the line or cord 80 does not fray while the balloon is aloft, which could result in premature separation of the payload 16 from the balloon envelope 12. The term "line" as used herein is to be construed broadly, and includes a cord, rope, string, cable, or other member that may be positioned with the tube or pathway member 42 and have ends that may be releasably secured within the actuated release mechanisms.

In addition as noted above, a significant advantage provided by the use of the two actuated cut-down mechanisms 98 and 88, tube or pathway member 42, and a line or cord 80 extending through the pathway member 42 with the ends 42a and 42b of the line or cord releasably secured to the actuated release mechanisms 98 and 88 is that a redundancy, or fail safe feature is provided for the payload cut-down mechanism.

In particular, if one of the actuated release members 98 or 88 fails to release an end 80a or 80b of the line or cord 80, the actuation of the other actuated release mechanism will still serve to effect the separation of the payload 16 from the balloon envelope 12. If one end of the line or cord remains attached to the actuated release mechanism, the other end of the cord will simply slip through the pathway member 14, causing the pathway member 14 which is secured to the balloon envelope 12 to separate from the payload 16. The carbon fiber tube 42 may be several inches in diameter, and should be of a sufficient diameter so that the cord may easily slip through the tube 42 in the event one of the actuated release mechanism fails to release one end of the line or cord 80.

Carbon fiber tube 42 is referred to herein as a pathway member. As used herein, the term "pathway member" is to be broadly construed and means any components, or combination of components that allow a pathway for line or cord 80 to extend from the first actuated release mechanism 98 to the second actuated release mechanism 88. In fact, even if tube 42 were not used, a pathway member would be formed between upper plate 60 and lower plate 62 which provides a pathway that line or cord 80 could use to extend between the first actuated release mechanism 98 and the second actuated release mechanism 88.

In some embodiments, the actuated release mechanisms may advantageously comprise a solenoid. Solenoids have the advantage operating reliably at very low temperatures, and take very little power to operate, which is important on a high altitude balloon where there may be limited power available to operate the electrical equipment and components on board.

Figure 10:
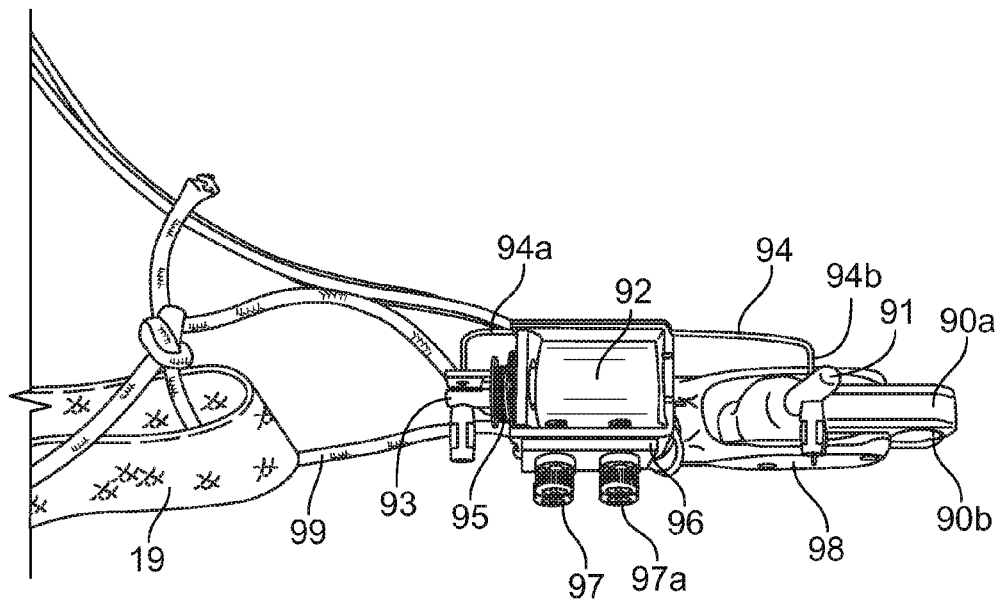
FIG. 10 shows a perspective view of actuating release mechanism 98 shown in FIGS. 5-8, according to an example embodiment.

As shown in FIG. 10, the actuated release mechanism 98 could use a trigger release mechanism such as the type used for archery releases, where a pair of opposed pivotable jaws 90a and 90b may be closed around a loop 81a in the end of the line or cord 80 (as shown in FIG. 8) to releasably secure the end 80a of the line or cord 80 to the actuated release mechanism 98. Upon receiving an appropriate signal, the trigger 91 of the actuated release mechanism 98 could be moved causing the jaws 90a and 90b to open and release the end 80a of the line or cord. As noted above, an archery-type release mechanism may advantageously be used because they have been optimized mechanically for maximum holding force and minimum actuation force.

The trigger release mechanism could be moved in a variety of different ways. For example, as shown in FIG. 10, a solenoid 92 having a linear actuating member 93 that moves in a linear direction upon activation may be used. A rigid member 94 could be attached to the trigger 91 at one end 94b and attached to the linear actuating member 93 at the other end 94a, such that upon receiving an appropriate signal, the solenoid 92 is activated thereby moving the linear actuating member 93 which in turns moves the trigger 91 causing the jaws 90a and 90b to open and release the end 80a of the line or cord that was releasably secured within the jaws 90a and 90b.

Figure 11:
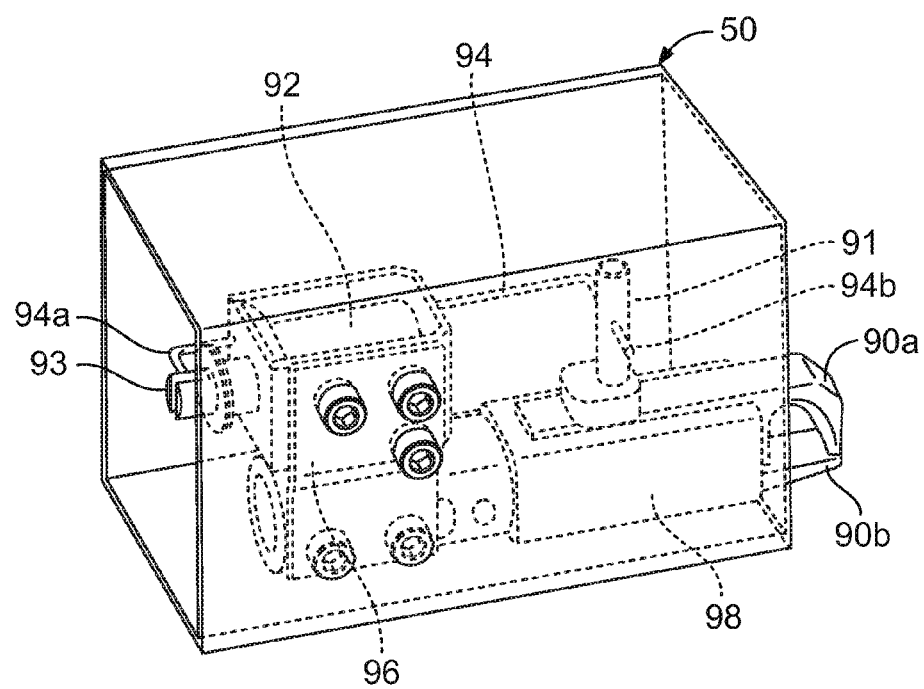
FIG. 11 shows another perspective view of actuating release mechanism 98 shown in protective housing 50, according to an example embodiment.

As shown in FIGS. 10 and 11, a mounting plate 96 may be used to mount the solenoid 92 to the actuated release mechanism 98, and also to mount the solenoid 92 to actuated release mechanism housing 50 with screws 97. In addition, a line 99 may be attached to the actuated release mechanism 98 which may be attached to a strap 19, which in turn may be attached to a payload harness or payload.

The solenoid 92 could be devised so the trigger 91 is either pushed or pulled. For example, the linear actuating member 93 of the solenoid 92 could be normally biased in an extended position, and upon activation of the solenoid 92, the linear actuating member 93 could be drawn into the solenoid 92, pulling the trigger 91 as a result. Alternatively, the linear actuating member 93 could be normally positioned in a retracted position, and upon activation, the linear actuating member 93 could be forced out into an extended position, pushing the trigger 91 as a result.

Additional ways of moving the trigger to open the jaws of the trigger release mechanism could also be employed. For example, a rotary shape memory alloy member could be used that pushes the trigger as it is rotated. Additionally, a rotary servo actuation method could also be used to move the trigger and open the jaws.

The actuated release mechanism does not require that an archery type trigger mechanism is used to releasably secure the ends of the line or cord. For example, a solenoid having a linear actuating member that moves in a linear direction upon activation may be used. For example, the end of the line or cord could have a line that is looped around the linear actuating member normally biased in an extended position, and upon receiving the appropriate signal, the solenoid could be activated to retract the linear actuating member, thereby releasing the end of the line or cord. Rotary type release mechanisms could also be used. For example, a loop on the end of the line or could be placed in a notch facing away from the balloon envelope, which upon receiving an appropriate signal could be rotated to turn the notch in a direction facing the balloon envelope and thereby releasing the end of the line or cord to effect separation of the payload from the balloon.

Figure 12:
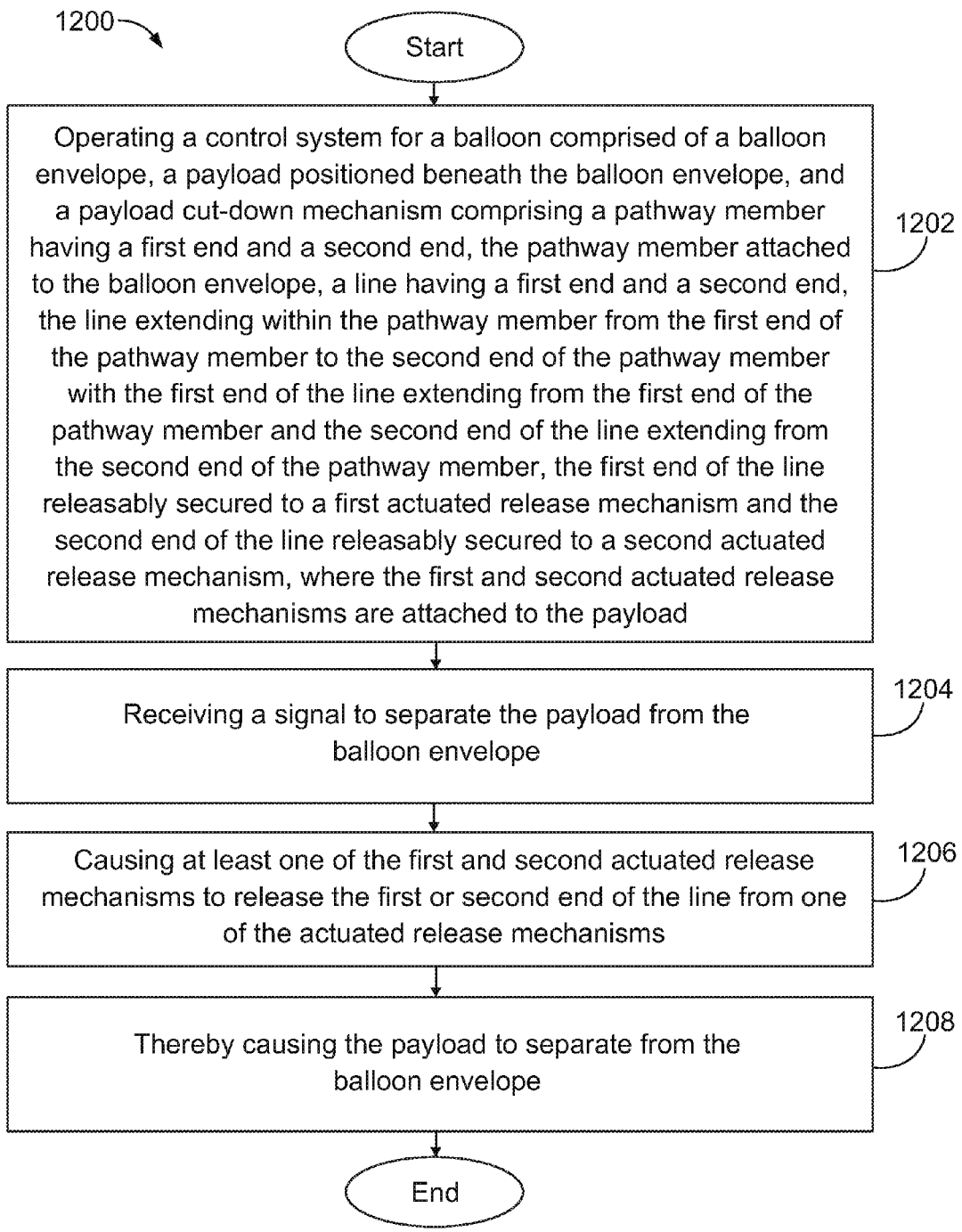
FIG. 12 is a method, according to an example embodiment.

FIG. 12 shows a method 1200 that is provided that includes the step 1202 of operating a control system for a balloon comprised of a balloon envelope, a payload positioned beneath the balloon envelope, and a payload cut-down mechanism comprising a pathway member having a first end and a second end, the pathway member attached to the balloon envelope, a line having a first end and a second end, the line extending within the pathway member from the first end of the pathway member to the second end of the pathway member with the first end of the line extending from the first end of the pathway member and the second end of the line extending from the second end of the pathway member, the first end of the line releasably secured to a first actuated release mechanism and the second end of the line releasably secured to a second actuated release mechanism, where the first and second actuated release mechanisms are attached to the payload. The method 1200 further includes the step 1204 of receiving a signal to separate the payload from the balloon envelope. In addition, the method 1200 further includes the step 1206 of causing at least one of the first and second actuated release mechanisms to release the first or second end of the line from one of the actuated release mechanisms. Further, the method 1200 also includes the step 1208 of causing the payload to separate from the balloon envelope.

5. A NON-TRANSITORY COMPUTER READABLE MEDIUM WITH INSTRUCTIONS TO CAUSE A PAYLOAD CUT-DOWN MECHANISM TO CAUSE A PAYLOAD TO SEPARATE FROM A BALLOON ENVELOPE

Some or all of the functions described above and illustrated in FIGS. 5-12 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include operating a control system for a balloon comprised of a balloon envelope, a payload positioned beneath the balloon envelope, and a payload cut-down mechanism comprising a pathway member having a first end and a second end, the pathway member attached to the balloon envelope, a line having a first end and a second end, the line extending within the pathway member from the first end of the pathway member to the second end of the pathway member with the first end of the line extending from the first end of the pathway member and the second end of the line extending from the second end of the pathway member, the first end of the line releasably secured to a first actuated release mechanism and the second of the line releasably secured to a second actuated release mechanism, where the first and second actuated release mechanisms are attached to the payload, receiving a signal to separate the payload from the balloon envelope, causing at least one of the first and second actuated release mechanisms to release the first or second end of the line from one of the actuated release mechanisms, and thereby causing the payload to separate from the balloon envelope.

6. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a pathway member having a tubular structure extending between a first end and a second end, the pathway member attached to a balloon envelope;
a line having a first end and a second end, the line extending within the pathway member from the first end of the pathway member to the second end of the pathway member;
the first end of the line extending from the first end of the pathway member and the second end of the line extending from the second end of the pathway member;
the first end of the line releasably secured to a first actuated release mechanism;
the second end of the line releasably secured to a second actuated release mechanism;
wherein the first actuated release mechanism is attached to a payload;
wherein the second actuated release mechanism is attached to the payload; and
wherein at least one of the first and second actuated release mechanisms are operable, upon receiving a signal, to release the first or second end of the line from one of the actuated release mechanisms and cause the payload to separate from the balloon envelope.

2. The apparatus of claim 1, wherein the pathway member is attached to the balloon envelope by being secured to a first rigid plate which is attached to the balloon envelope.

3. The apparatus of claim 2, wherein the pathway member is positioned between the first plate and a second plate that is secured above the payload.

4. The apparatus of claim 3, wherein compressible foam is positioned between the first plate and the second plate.

5. The apparatus of claim 2, wherein the pathway member is secured to the first plate with a plurality of ties that extend through a plurality of holes within the first plate and encircle the pathway member.

6. The apparatus of claim 1, wherein the first actuated release mechanism is attached to the payload by being attached to a payload harness positioned about the payload.

7. The apparatus of claim 6, wherein the second actuated release mechanism is attached to the payload by being attached to the payload harness positioned about the payload.

8. The apparatus of claim 1, wherein both of the first and second actuated release mechanism are operable, upon receiving a signal, to release the first and second ends of the line and to cause the payload to separate from the balloon envelope.

9. The apparatus of claim 1, wherein the pathway member is positioned above a drag disk, and the payload is attached to the drag disk.

10. The apparatus of claim 9, wherein the first actuated release mechanism is positioned within a first opening in a drag disk, and the second actuated release mechanism is positioned within a second opening in the drag disk.

11. The apparatus of claim 1, wherein the first actuated release mechanism is attached to the payload by being attached to a first strap that is attached to the payload harness, and the second actuated release mechanism is attached to the payload by being attached to a second strap that is attached to the payload harness.

12. The apparatus of claim 1, wherein the first actuated release mechanism includes pivotable jaws that are closed around the first end of the line to releasably secure the first end of the line to the first actuated release mechanism, and the second actuated release mechanism includes pivotable jaws that are closed around the second end of the line to releasably secure the second end of the line to the second actuated release mechanism.

13. The apparatus of claim 12, wherein, upon receiving the signal, the pivotable jaws of the first actuated release mechanism open and release the first end of the line, and the pivotable jaws of the second actuated release mechanism open and release the second end of the line.

14. The apparatus of claim 13, wherein the first actuated release mechanism includes a trigger that is connected to a solenoid, and upon receiving the signal an actuating member of the solenoid is actuated to move the trigger that opens the pivotable jaws to release the first end of the line, and the second actuated release mechanism includes a trigger that is connected to a solenoid, and upon receiving the signal an actuating member of the solenoid is actuated to move the trigger that opens the pivotable jaws of the second actuated release mechanism to release the second end of the line.

15. The apparatus of claim 1, wherein the first actuated release mechanism comprises a solenoid, and upon receiving the signal an actuating member of the solenoid is moved to release the first end of the line, and the second actuated release mechanism comprises a solenoid, and upon receiving the signal an actuating member of the solenoid is moved to release the second end of the line.

16. The apparatus of claim 1, wherein the pathway member comprises a carbon fiber tube.

17. A balloon, comprising:
a balloon envelope;
a payload positioned beneath the balloon envelope;
a pathway member having a tubular structure extending between a first end and a second end, the pathway member attached to the balloon envelope;
a line having a first end and a second end, the line extending within the pathway member from the first end of the pathway member to the second end of the pathway member;
the first end of the line extending from the first end of the pathway member and the second end of the line extending from the second end of the pathway member;
the first end of the line releasably secured to a first actuated release mechanism;
the second end of the line releasably secured to a second actuated release mechanism;
wherein the first actuated release mechanism is attached to a payload;
wherein the second actuated release mechanism is attached to the payload; and
a control system configured such that, upon receiving a signal, at least one of the first and second actuated release mechanisms is operable to release the first or second end of the line from one of the actuated release mechanisms and cause the payload to separate from the balloon envelope.

18. The balloon of claim 17, wherein the pathway member is attached to the balloon envelope by being secured to a first rigid plate which is attached to the balloon envelope.

19. The balloon of claim 18, wherein the pathway member is positioned between the first plate and a second plate that is secured above the payload.

20. The balloon of claim 18, wherein the first actuated release mechanism includes pivotable jaws that are closed around the first end of the line to releasably secure the first end of the line to the first actuated release mechanism, and the second actuated release mechanism includes pivotable jaws that are closed around the second end of the line to releasably secure the second end of the line to the second actuated release mechanism.

21. The balloon of claim 20, wherein the control system is configured such that upon receiving the signal the pivotable jaws of the first and second actuated release mechanisms open and release the first and second ends of the line.

22. The balloon of claim 21, wherein the first actuated release mechanism includes a trigger that is connected to a first solenoid, and upon receiving the signal the first solenoid is actuated to move the trigger that opens the pivotable jaws to release the first end of the line, and the second actuated release mechanism includes a trigger that is connected to a second solenoid, and upon receiving the signal the second solenoid is actuated to move the trigger that opens the pivotable jaws to release the second end of the line.

23. The balloon of claim 17, wherein the first actuated release mechanism and the second actuated release mechanism are attached to the payload by being attached to a payload harness positioned about the payload.

24. The balloon of claim 17, wherein the control system is configured such that, upon receiving the signal, both of the first and second actuated release mechanism are operable to release the first and second ends of the line and to cause the payload to separate from the balloon envelope.

25. The balloon of claim 17, wherein the first actuated release mechanism comprises a first solenoid, and upon receiving the signal an actuating member of the first solenoid is moved to release the first end of the line, and the second actuated release mechanism comprises a second solenoid, and upon receiving the signal an actuating member of the second solenoid is moved to release the second end of the line.

26. The payload cut-down mechanism of claim 17, including means for separating the payload from the balloon envelope.

27. A computer-implemented method, comprising:
operating a control system in a balloon comprised of a balloon envelope, a payload positioned beneath the balloon envelope, and a payload cut-down mechanism comprising a pathway member having a tubular structure extending between a first end and a second end, the pathway member attached to the balloon envelope, a line having a first end and a second end, the line extending within the pathway member from the first end of the pathway member to the second end of the pathway member with the first end of the line extending from the first end of the pathway member and the second end of the line extending from the second end of the pathway member, the first end of the line releasably secured to a first actuated release mechanism and the second of the line releasably secured to a second actuated release mechanism, where the first and second actuated release mechanisms are attached to the payload;
receiving a signal to separate the payload from the balloon envelope;
causing at least one of the first and second actuated release mechanisms to release the first or second end of the line from one of the actuated release mechanisms; and thereby
causing the payload to separate from the balloon envelope.

28. The computer-implemented method of claim 27, further including the step of upon receiving the signal, causing the other of the first and second actuated release mechanisms to release the other of the first or second end of the line from the other of the actuated release mechanisms.

29. A non-transitory computer readable medium having stored therein instructions executable by a computing device to cause the computing device to perform functions comprising:
operating a control system in a balloon comprised of a balloon envelope, a payload positioned beneath the balloon envelope, and a payload cut-down mechanism comprising a pathway member having a tubular structure extending between a first end and a second end, the pathway member attached to the balloon envelope, a line having a first end and a second end, the line extending within the pathway member from the first end of the pathway member to the second end of the pathway member with the first end of the line extending from the first end of the pathway member and the second end of the line extending from the second end of the pathway member, the first end of the line releasably secured to a first actuated release mechanism and the second end of the line releasably secured to a second actuated release mechanism, where the first and second actuated release mechanisms are attached to the payload;

receiving a signal to separate the payload from the balloon envelope;

causing at least one of the first and second actuated release mechanisms to release the first or second end of the line from one of the actuated release mechanisms; and thereby causing the payload to separate from the balloon envelope.

30. The non-transitory computer readable medium of claim 29, further including the function of upon receiving the signal, causing the other of the first and second actuated release mechanisms to release the other of the first or second end of the line from the other of the actuated release mechanisms.

* * * * *